United States Patent Office 2,985,643
Patented May 23, 1961

2,985,643
PROCESS FOR CONVERSION OF LIGNO-CELLULOSE MATERIALS

Daryl R. Boomer and Edward T. Clapperton, Oak Ridge, Oreg., and Russell C. Phillips, Menlo Park, Calif., assignors to Wooduse, Inc., San Francisco, Calif., a corporation of California No Drawing. Filed Jan. 3, 1956, Ser. No. 556,802

9 Claims. (Cl. 260—124)

This invention relates to the treatment of ligno-cellulose materials and has particular reference to a process for the preparation of agricultural nutrient carriers and soil-conditioning agents from ligneous and cellulosic wastes.

It has heretofore been proposed to use ligno-cellulose waste materials, such as sawdust, begasse and the like, as agricultural nutrient carriers and as soil-conditioning agents similar to humus. However, it is known that these materials as such are not suitable for use in soils for the reason that the cellulosic content thereof supports the growth of bacteria and fungi with resultant depletion of the nitrogen and other fertilizer materials present in the soil. It is also known that the nitrogen-depleting tendencies of aligno-cellulose materials may be partially or completely overcome by heating the materials in the presence of a mineral acid to convert part or substantially all of the cellulosic fraction to an unreactive or inert form which will not support any substantial bacterial or fungus-forming action. One of the principal objects of this invention is to provide a novel process for the production of agricultural nutrient carriers and/or soil-conditioning agents from ligno-cellulose materials.

Another object of this invention is to provide a process of conversion of ligno-cellulose which is economically superior to those heretofore proposed.

Other objects and advantages of this invention is believed will be readily apparent from the following detailed description of preferred embodiments thereof.

Briefly, this invention comprehends within its scope the discovery that novel and unexpected results in the conversion of ligno-cellulose materials are obtained by utilizing in the conversion process a mixture of phosphoric and sulfuric acids. It has been found that the use of such an acid mixture results in more complete conversion of the cellulose, as measured by the fixed carbon in the product, than has heretofore been possible utilizing either sulfuric acid or phosphoric acid alone. Moreover, the phosphoric acid is not lost in the processing but remains in the final product in a form in which it is utilizable as a soil nutrient.

In carrying out the process of this invention the ligno-cellulose material, preferably in comminuted form, is thoroughly mixed with an aqueous solution of phosphoric acid and sulfuric acid. The ligno-cellulose material may be air or kiln dried, or may be in a green state. For maximum cellulose conversion, based upon the fixed carbon content of the final product, the mixture comprises about 60% phosphoric acid and 40% sulfuric acid by weight, although significant increases in fixed carbons over the use of either phosphoric or sulfuric acid alone are observed by using from about 20 to about 80% phosphoric acid and from about 80 to about 20% sulfuric acid. The concentration of the acid solution is not critical and may vary from about 10 to about 80% of total solution by weight. About 25% acid by weight is preferred. Roughly 2.0% of acid, on a dry basis, based on the dry weight of the ligno-cellulose material, is utilized but this may vary from about 1.5 to about 10%.

The mixture of acid and ligno-cellulose material is then heated, under atmospheric pressure, to a temperature sufficiently high to bring about the conversion reaction, i.e., to chemically convert at least a portion of the cellulose. This temperature varies, depending primarily upon the type of raw material being utilized, but generally from about 350° to about 600° F. is sufficient. The reaction is exothermic and care should be taken to avoid excessive heating which would result in undue charring or excessive decomposition of the material. While the time of heating may be varied to control the degree of conversion, generally between about 1 and about 18 minutes is adequate for most purposes, depending upon the method of heat transfer employed.

The reacted material is preferably cooled to stop further reaction and may then be stored as such for use or may be treated with other chemicals such as ammonia, potassium hydroxide and the like, to neutralize the residual acid and to incorporate in the product valuable soil nutrients.

The following are specific examples of process conditions utilized in carrying out the process of this invention, but it is to be understood that the invention is not to be limited thereto:

| Example No. | 1 | 2 | 3 | 4 | 5 | 6 | 7 |
|---|---|---|---|---|---|---|---|
| Lbs. Sawdust as is | 10 | 10 | 10 | 10 | 10 | 10 | 10 |
| Sawdust Moisture Content | 12.0 | 12.0 | 12.0 | 12.0 | 12.0 | 12.0 | 12.0 |
| Percent H$_2$SO$_4$ | 0 | 20 | 40 | 50 | 60 | 80 | 100 |
| Percent H$_3$PO$_4$ | 100 | 80 | 60 | 50 | 40 | 20 | 0 |
| Lbs. Acid Water Free | 0.26 | 0.26 | 0.26 | 0.26 | 0.26 | 0.26 | 0.26 |
| Lbs. Water Added | 3.6 | 3.6 | 3.6 | 3.6 | 3.7 | 3.7 | 3.7 |
| Treated Sawdust Moisture Content | 35 | 35 | 35 | 35 | 35 | 35 | 35 |
| Percent Acid Conc. (Dry Basis) | 2.9 | 2.9 | 2.9 | 2.9 | 2.9 | 2.9 | 2.9 |
| pH Feed | 2.00 | 1.85 | 1.69 | 1.62 | 1.50 | 1.50 | 1.45 |
| Percent Fixed Carbon | 30.1 | 30.5 | 30.5 | 30.0 | 29.5 | 27.8 | 28.5 |
| Percent Volatile | 69.4 | 68.5 | 68.9 | 69.4 | 69.9 | 71.5 | 71.0 |
| Percent Ash | 0.50 | 1.01 | 0.53 | 0.56 | 0.59 | 0.71 | 0.53 |
| Feed Weight (lbs.) | 3 | 3 | 3 | 3 | 3 | 3 | 3 |
| Time (Min.) | 15½ | 15 | 14 | 15 | 15 | 15 | 13½ |
| Air Rate (Lb./Min.) | 8.1 | 8.1 | 8.1 | 8.1 | 8.1 | 8.1 | 8.1 |
| Temp. Below Bed (° F.) | 445 | 440 | 440 | 425 | 415 | 410 | 410 |
| Temp. ½″ up in Bed (° F.) | 460 | 455 | 450 | 430 | 425 | 420 | 420 |
| Temp. 2″ up in Bed (° F.) | 470 | 470 | 460 | 445 | 440 | 430 | 435 |
| Temp. Above Bed (° F.) | | 470 | 455 | 450 | 420 | 415 | 415 |
| Product: | | | | | | | |
| Weight (Lbs.) | 1.72 | 1.59 | 1.53 | 1.59 | 1.59 | 1.56 | 1.59 |
| Percent Yield (Dry Basis) | 88 | 82 | 79 | 82 | 82 | 80 | 82 |
| pH | 2.06 | 2.10 | 2.22 | 2.18 | 2.10 | 2.03 | 2.09 |
| Percent Fixed Carbon | 37.6 | 40.4 | 41.7 | 39.9 | 39.3 | 37.6 | 37.1 |
| Percent Volatile | 62.4 | 58.8 | 57.5 | 59.1 | 59.8 | 61.5 | 62.4 |
| Percent Ash | 1.01 | 0.84 | 0.81 | 1.01 | 0.87 | 0.91 | 0.48 |

Examples 1 through 7 set forth in the above table were carried out by first screening mill-run fir sawdust to obtain a particle size range of +8–12. Then predetermined quantities of acid and water were mixed and then sprayed on the sawdust with a spray gun as it was tumbled in a concrete mixer. Three pound charges of the acid-treated sawdust were retained in a screen-bottom, open-top drawer, 12 inches square. Air at 400° to 445° F. and 8.1 lb./min. was passed through the bed of acid-treated sawdust, until, by appearances, the reaction was complete. The reaction was considered complete when the material darkened considerably, approaching a black or charcoal color. The reaction time was recorded, and the material was then quickly spread on a concrete floor to cool the product and terminate the reaction. The cooled product was weighed to obtain the yield and a sample was analyzed. Examples 1 and 7 illustrate the use of phosphoric acid and sulfuric acid alone, respectively.

The process of this invention may be carried out by a variety of methods. The batch method of the above examples is adapted to be used as such, or continuously by carrying out the reaction on a moving belt or chain conveyor. Another method is illustrated in our copending application Serial No. 555,449, filed December 27, 1955, now Patent No. 2,901,339, on "Continuous Process for Conversion of Ligno-Cellulose Materials." In that method, the acid-sawdust mixture is reacted while in the form of a fluidized bed, the gaseous heating medium there also functioning as a conveying medium. The following is a specific example of the mixed acid process of this invention utilizing that method, wherein the reaction chamber comprised an expanded section of insulated piping 5 feet high and having a diameter of 8.13 inches:

*Example 8*

| | |
|---|---|
| Ligno-cellulose material | Fir sawdust. |
| Sawdust particle size range | +5–24 mesh. |
| Acid type | Mixture of 60% $H_3PO_4$, 40% $H_2SO_4$. |
| Acid proportion | 2%, based on dry weight of sawdust. |
| Moisture content of treated sawdust | 35% by weight. |
| Air rate to burner | 9.2 lb./min. |
| Feed rate to reactor | 2.65 lb./min. |
| Temperature before feed | 1125° F. |
| Temperature bottom reactor | 900° F. |
| Temperature top reactor | 775° F. |
| Temperature into cyclone | 595° F. |
| Temperature solids from cyclone | 380° F. |
| Product weight | 1.38 lbs./min. |
| Yield, dry basis | 81%. |
| Properties of product: | |
| pH | 1.75. |
| Fixed carbon | 35.2%. |
| Volatile | 64.1%. |
| Ash | 0.72%. |

In addition to fir sawdust, the process of this invention has been applied to the treatment of other ligno-cellulose materials such as redwood sawdust and bagasse. The process is applicable to ligno-cellulose materials generally, including all types of woods, waste coffee grounds from soluble coffee manufacture, etc. Plant growth tests of the product show it to be an effective agricultural nutrient carrier and to have promise as a soil-conditioning agent. It appears to be particularly efficacious in that it slowly releases nitrogen to the soil during the growing season.

The use of the mixture of phosphoric acid and sulfuric acid in the process of this invention produces an unexpected phenomenon in that the fixed carbon value of the product is significantly greater than that obtained when the acids are used separately in the same concentration. Thus, a lesser amount of the mixed acid may be used to obtain the same degree of conversion as has heretofore been obtainable with a specific concentration of a single mineral acid. Moreover, since phosphoric acid is desirable for its nutritional value to crops, and since it is satisfactorily heat stable, the use of the mixed acid is an excellent method for introducing it into the product, while keeping the acid requirements at a low level. Other agricultural nutrients, such as ammonia, potassium, and trace elements may be incorporated in the product if desired.

Having fully described our invention, it is to be understood that we do not wish to be limited to the details set forth, but our invention is of the full scope of the appended claims.

We claim:

1. A process for the treatment of particulate ligno-cellulose materials, comprising the steps of mixing the particles with a mixture of from about 20 to about 80 percent of phosphoric acid and from about 80 to about 20 percent sulfuric acid, and heating the mixture thus formed at a temperature sufficiently high and for a sufficient length of time to chemically convert at least a portion of the cellulose in said mixture.

2. A process for the treatment of particulate ligno-cellulose materials, comprising the steps of mixing the particles with a mixture comprising about 60 percent by weight of phosphoric acid and about 40 percent by weight of sulfuric acid, and heating the mixture thus formed at a temperature sufficiently high and for a sufficient length of time to chemically convert at least a portion of the cellulose in said mixture.

3. A process for the treatment of particulate ligno-cellulose materials, comprising the steps of mixing the particles with a mixture of from about 20 to about 80 percent phosphoric acid and from about 80 to about 20 percent sulfuric acid, and heating the mixture thus formed to a temperature between about 350° and about 600° F. for between about 1 and about 18 minutes to chemically convert at least a portion of the cellulose in said mixture.

4. A process for the treatment of particulate ligno-cellulose materials, comprising the steps of mixing the particles with from about 1.5 to about 10 percent by weight, on a dry basis, of a mixture comprising about 60 percent by weight of phosphoric acid and about 40 percent by weight of sulfuric acid, and heating the mixture thus formed at a temperature sufficiently high and for a sufficient length of time to chemically convert at least a portion of the cellulose in said mixture.

5. A process for the treatment of particulate ligno-cellulose materials, comprising the steps of mixing the particles with from about 1.5 to about 10 percent by weight, on a dry basis, of a mixture of from about 20 to about 80 percent phosphoric acid and from about 80 to about 20 percent sulfuric acid, and heating the mixture thus formed to a temperature between about 350° and about 600° F. for between about 1 and about 18 minutes to chemically convert at least a portion of the cellulose in said mixture.

6. A process for the treatment of particulate ligno-cellulose materials, comprising the steps of mixing the particles with a mixture comprising about 60 percent by weight of phosphoric acid and about 40 percent by weight of sulfuric acid, and heating the mixture thus formed to a temperature between about 350° and about 600° F. for between about 1 and about 18 minutes to chemically convert at least a portion of the cellulose in said mixture.

7. A process for the treatment of particulate ligno-cellulose materials, comprising the steps of mixing the particles with from about 1.5 to about 10 percent by weight, on a dry basis, of a mixture comprising about 60 percent by weight phosphoric acid and about 40 percent by weight sulfuric acid, and heating the mixture thus formed to a temperature between about 350° and about 600° F. for between about 1 and about 18 minutes to chemically convert at least a portion of the cellulose in said mixture.

8. A process for the treatment of particulate ligno-cellulose materials, comprising the steps of mixing the particles with a mixture of from about 20 to about 80 percent of phosphoric acid and from about 80 to about 20 percent sulfuric acid, and heating the mixture thus formed to a temperature not substantially above about 600° F. to chemically convert at least a portion of the cellulose in said mixture.

9. A process for the treatment of particulate ligno-cellulose materials, comprising the steps of mixing the particles with from about 1.5 to about 10 percent by weight, on a dry basis, of a mixture comprising about 60 percent by weight of phosphoric acid and about 40 percent by weight of sulfuric acid, and heating the mixture thus formed to a temperature not substantially above about 600° F. to chemically convert at least a portion of the cellulose in said mixture.

References Cited in the file of this patent

UNITED STATES PATENTS 2,574,027　　Farber　　Nov. 6, 1951